UNITED STATES PATENT OFFICE 2,522,366

PREPARATION OF SUBSTITUTED GLUTARIC ACID ESTERS

William F. Gresham, Wilmington, Del., assignor to E. I. du Pont de Nemours & Company, Wilmington, Del., a corporation of Delaware No Drawing. Application November 1, 1947, Serial No. 783,627

5 Claims. (Cl. 260—485)

This invention relates to a process for the preparation of dialkyl esters of alpha-methylene glutaric acid, and more particularly to the preparation of such esters from alkyl beta-alkoxypropionates.

It is known that the alkyl acrylates can be prepared from the beta-alkoxypropionic acid esters by reacting these esters using acids or alkali metal alkoxides as catalysts. In these known reactions, however, the free alcohol formed and/or used as a solvent is distilled off as the reaction proceeds. (N. M. Bortnick, U. S. Patent 2,393,737.) Similarly, substituted products are prepared by conducting a reaction of the alkyl beta-alkoxy carboxylic acids in the presence of an alcohol boiling higher than the alcohol split off the ester during the reaction. (Seeger Patent U. S. 2,393,000.) In these reactions the removal of alcohols formed during the reaction precludes the possibility of converting the ester reacted to glutarate esters.

An object of the present invention is to provide a process for the preparation of new compositions of matter. A further object is to provide a process for the preparation of dialkyl esters of alpha-substituted glutaric acids from alkyl beta-alkoxypropionates in the presence of a condensation catalyst. Another object is to provide a process for the polymerization of dialkyl esters of alpha-methylene glutaric acid and, likewise, the polymers thus obtained. Other objects and advantages of the invention will hereinafter appear.

The monomeric esters of alpha-methylene glutaric acid are prepared in accord with the invention by subjecting an alkyl beta-alkoxypropionate to a sufficiently high temperature, generally at about the boiling point of the ester, to split off an alcohol, the reaction being effected in the presence of a basic catalyst and without removing by distillation or otherwise the alcohol or other low boiling products of the reaction. If the low boiling compounds are taken off during the reaction, the formation of glutaric acid esters is suppressed. Moreover, it is recommended that no solvent such as an alcohol be added with the catalyst or to the reaction for, although alcohols are formed during the reaction, an excess over and above the formed alcohol lowers appreciably the rate of reaction. After the reaction starts, the boiling-point of the reacting mixture falls and is then held substantially constant for from ¼ to 8 hours depending upon catalyst concentration. The reaction mixture is then neutralized, by-products are separated by distillation, and the glutarate then recovered from the residue by vacuum distillation.

Generally, the reaction may be illustrated by the equation:

(1)

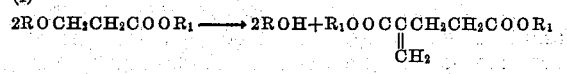

wherein R and R₁ are similar or dissimilar alkyl groups such as methyl, ethyl, normal and isopropyl, normal and isobutyl, and higher alkyl groups; or an aryl group, such as phenyl, or tolyl; or a substituted alkyl or aryl group.

A specific embodiment of the invention is illustrated by the equation:

(2)

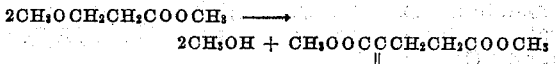

wherein methyl beta-methoxypropionate is converted to dimethyl alpha-methylene glutarate.

It has been found that along with the formation of dimethyl alpha-methylene glutarate, there is also obtained, probably as an intermediate, some dimethyl alpha-methoxymethyl glutarate, which is believed to be formed in accord with this equation:

(3)

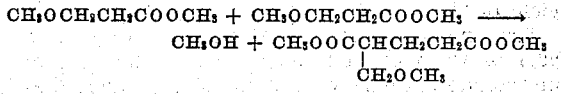

Two moles of methyl-methoxypropionate undergoes condensation with one mole of methanol splitting off to give methyl-alpha-methoxymethyl glutarate which in turn partially decomposes to form dimethyl-alpha-methylene glutarate as indicated by equation:

(4)

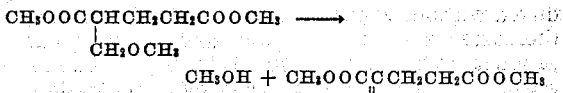

The reaction is conducted at a temperature between 75° and 150° C. and preferably between 80° and 110° C. Pressures do not appear to materially effect the course of the reaction, although reduced, superatmospheric or normal pressures may be employed if desired.

The examples illustrate preferred embodiments of the invention in which parts are by weight unless otherwise indicated.

*Example 1.*—Methyl-beta-methoxypropionate containing 1% hydroquinone and 1% sodium methoxide as the catalyst was heated in a flask, provided with a reflux condenser without a vapor take-off, with stirring to a temperature between 100° and 105° C. An exothermic reaction occurred, boiling commenced, and the temperature fell to between 85° and 90° C. The reaction was permitted to proceed for approximately ¼ hour. Glacial acetic acid was then added to neutralize the catalyst. The resulting mixture was subjected to distillation, methyl alcohol, methyl acrylate, and methoxy propionate distilling over leaving dimethyl alpha-methylene glutarate and dimethyl alpha-methoxymethyl glutarate, which were separated by vacuum fractional distillation in a conversion of approximately 15% and a yield between 85 and 90%.

The compounds have these properties: Dimethyl alpha-methylene glutarate; B. P. 73°/2.5 mm., $n_D^5$ 1,4436; saponification number: found 646 and 661; calculated 650 mg. KOH/g. sample; methoxyl found 0.5%; calculated 0%. Dimethyl alpha-methoxymethylglutarate; B. P. 86-89°/1 mm. $n_D^{25}$ 1,4330; saponification number: calculated, 550; found, 540; methoxyl: calculated, 15.2%; found 13.2%.

*Example 2.*—A flask similar to that used in Example 1 was charged with 40 parts of methyl beta-methoxypropionate and one part of sodium methoxide. The charge was heated for ½ hour at a temperature between 100° and 135° C. and then heated under reflux without vapor take-off for one hour. The pressure was reduced from 2 to 5 mm. and 3.3 parts of the product recovered at 80° to 85° C. The residue was resinous. A sample of the 80° to 85° C. fraction was hydrolyzed with 20% hydrochloric acid. On cooling, crystalline alpha-methylene glutaric acids separated. After washing and drying, it had M. P. 128-9° C.

*Example 3.*—Methyl beta-methoxypropionate, 40 parts, and sodium methoxide, 0.25 part, were mixed with 0.1 part of hydroquinone in a glass flask. The resulting mixture was warmed on a water bath for one hour under a nitrogen blanket. The resulting mixture was then allowed to stand over night and was then diluted with ether and washed 3 times with water. 4.5 parts of dimethyl alpha-methylene-glutarate was obtained as described in Example 2 which constituted a yield of 75%.

*Example 4.*—Methyl beta-methoxypropionate 58.5 parts, hydroquinone 0.3 part, and sodium methoxide 0.5 part were charged in a flask and heated to 120° C. for 15 minutes. No reaction appeared to take place during this time. A few drops of methanol did not initiate the reaction nor did the addition of 0.2 part more of sodium methoxide. The addition of 0.2 additional part of sodium methoxide making a total of 0.9 part caused a vigorous reaction. The mixture was refluxed without vapor take-off for 15 minutes and thereafter 2 parts of acetic acid added. The product was cooled, diluted with isopentane, washed with water, and dried over magnesium sulphate. 6 to 8 parts of dimethyl alpha-methylene glutarate was obtained by the process of Example 2 in a conversion of 16% and a yield of 87%.

*Example 5.*—Methyl beta-methoxypropionate 49 parts and hydroquinone 0.5 part, were stirred together and heated to 110° C. under a nitrogen blanket. During the stirring 0.2 part of metallic sodium was added in pieces. A vigorous reaction occurred during which the temperature dropped to 95° C., all vapors being condensed and returned to the reaction. After 5 minutes, acetic acid was added to neutralize the catalyst; the mixture cooled, diluted with isopentane, and washed with water. Dimethyl alpha-methylene glutarate was recovered in a conversion of about 10% and a yield of 85 to 90%.

The examples illustrate batchwise in contrast to continuous type operations, although the nature of the reaction is such that operation can likewise be conducted with advantage by a continuous process. Such a process may be carried out by passing, at controlled rate, the alkyl beta-alkoxypropionate containing the catalyst into a tubular reaction zone of considerable length wherein the temperature of the reaction is controlled by any suitable heating means. The reaction mixture as it issues from the converter is neutralized and the resulting neutral or slightly acidic mixture subjected to distillation for the recovery of the esters. Methyl acrylate and methyl alpha-methoxymethyl glutarate produced as by-product may be recycled to the reaction mixture for conversion to methoxypropionate and methylene glutarate.

The reaction has been found to be a general one for the treatment of esters of beta-alkoxypropionic acid and especially for the treatment of the lower alkyl ester, such as the methyl, ethyl, normal and isopropyl, normal and isobutyl esters of the beta-lower-alkoxy: e. g., beta-methoxy, beta-ethoxy, and beta-propoxypropionates.

In addition to the catalysts described in the examples, other alkali metal and alkaline earth metal alkoxides generally may be employed as well as their oxides, hydroxides, and the quaternary ammonium hydroxides and organic amines, those soluble in the ester treated being preferred.

Inasmuch as the products of the reaction are polymerizable, it is advantageous to use along with the catalyst a suitable polymerization inhibitor, such, for example, as hydroquinone, pyrogallol, elemental sulfur, or other well known polymerization inhibitors which are capable of inhibiting the polymerization of compounds containing an unsaturated olefinic bond.

The alpha-methylene glutarates produced in accord with this invention are polymerizable to colorless, glass-like, tough, solid polymers by heating the ester in the presence of a suitable polymerizing catalyst, such, for example, as organic compounds known as free-radical formers. By this, I mean such catalysts as an azo compound e. g., dimethyl alpha alpha' -azo-diisobutyrate; an amine oxide; a hydrazine; oxygen; ozone; an organic peroxide, and the like. Actinic light may also be used. Benzoyl peroxide is well-adapted as a polymerization catalyst as well as the more highly active alkyl-substituted peroxides as the dialkyl peroxides and tertiary alkyl peroxides. Other polymerization catalysts which may be used include the persulfates, perborates, percarbonates, and hydrogen peroxides. The esters may, in the absence of a polymerization inhibitor, be produced directly as solids, although usually the polymer is best prepared from the isolated monomer in the presence of a suitable polymerization catalyst.

The polymerization may take place spontaneously but is preferably controlled by heating the unsaturated alpha-methylene glutarates and like esters to a temperature between 70° C. to 250° C.

under which conditions the polymerization takes place rapidly depending on the catalyst employed.

The example which follows illustrates polymerization embodiments of the invention:

*Example 7.*—To about 5 parts of dimethyl alpha-methylene glutarate was added 0.05 part of dibenzoyl peroxide. The mixture was heated on a steam bath for six hours during which time the liquid increased in viscosity and finally produced a colorless, hard, organic glass.

The dialkyl alpha-methylene glutarates have many valuable uses. In their monomeric form they may be employed effectively as solvents and plasticizers, and in the latter use they may be dissolved in the resin to be plasticized and polymerized in situ or not as desired. In their polymeric form they may be used in the preparation of molding powders for injection molding, for example. The alpha-alkoxymethyl-substituted glutarates are all likewise suitable as solvents and plasticizers and for various other uses.

I claim:

1. A process for the preparation of alpha-substituted glutaric acid esters which comprises heating a mixture of an alkyl beta-alkoxypropionate, a polymerization inhibitor and an alkaline condensation catalyst, thereby converting the ester to an alpha-substituted glutaric acid ester and conducting the conversion in the presence of the alcohol as it is split off the alkyl beta-alkoxypropionate during the conversion.

2. The process of claim 1 conducted at a temperature between 80° and 110° C.

3. A process for the preparation of dimethyl alpha-methylene glutarate which comprises heating a mixture of methyl beta-methoxypropionate, a polymerization inhibitor, and an alkaline condensation catalyst, thereby converting the methyl beta-methoxypropionate to dimethyl alpha-methylene glutarate and conducting the conversion in the presence of the methanol as it is split off the methyl beta-methoxypropionate during its conversion.

4. The process of claim 3 in which an alkali metal alkoxide is employed as the catalyst.

5. The process of claim 3 conducted at a temperature between 75° and 150° C. and in the presence of sodium methoxide as the catalyst.

WILLIAM F. GRESHAM.

REFERENCES CITED

The following references are of record in the file of this patent:

UNITED STATES PATENTS

| Number | Name | Date |
|---|---|---|
| 2,313,501 | Bachman et al. | Mar. 9, 1943 |
| 2,341,663 | Schulz | Feb. 15, 1944 |
| 2,433,616 | Marple et al. | Dec. 30, 1947 |

OTHER REFERENCES

Beilstein, Handbuch der organischen Chemie, 4th ed., vol. 2, page 775 (1920 ed.) and page 657 (1942 ed.).

Goss, J. Chem. Soc. London, vol. 127, pages 2779–2780 (1925).